United States Patent [19]

Yoda et al.

[11] Patent Number: 4,708,609
[45] Date of Patent: Nov. 24, 1987

[54] TIRE MANUFACTURING MOLD

[75] Inventors: Yasutada Yoda; Seisuke Sueyasu, both of Higashimurayama; Shoji Futamura, Kawasaki, all of Japan

[73] Assignee: Bridgestone Corporation, Tokyo, Japan

[21] Appl. No.: 713,951

[22] Filed: Mar. 20, 1985

[30] Foreign Application Priority Data

| Mar. 22, 1984 [JP] | Japan | 59-55085 |
| Apr. 24, 1984 [JP] | Japan | 59-82412 |
| May 2, 1984 [JP] | Japan | 59-89095 |
| May 2, 1984 [JP] | Japan | 59-89096 |
| May 2, 1984 [JP] | Japan | 59-89097 |

[51] Int. Cl.$^4$ .................................... B29C 33/10
[52] U.S. Cl. .................... 425/28 D; 249/102; 249/141; 425/195; 425/812
[58] Field of Search .............. 425/28 R, 28 D, 46, 425/47, 49, 195, 812; 249/102, 103, 104, 141

[56] References Cited

U.S. PATENT DOCUMENTS

| 2,581,939 | 1/1952 | Deist et al. | 425/28 R |
| 2,756,460 | 7/1956 | Heintz, Jr. | 425/28 D |
| 3,354,509 | 11/1967 | Ammondson | 249/141 |
| 3,377,662 | 4/1968 | Fukushima | 425/28 R |
| 3,692,090 | 9/1972 | Brobeck et al. | 425/46 |
| 4,021,168 | 5/1977 | Dailey | 249/141 |
| 4,026,512 | 5/1977 | Holt | 249/141 |
| 4,447,197 | 5/1984 | Bartley et al. | 249/141 |
| 4,492,554 | 1/1985 | Carter | 425/28 R |
| 4,576,559 | 3/1986 | Yoda et al. | 425/28 R |

FOREIGN PATENT DOCUMENTS

| 3,306,866 | 8/1984 | Fed. Rep. of Germany | 425/46 |
| 124835 | 7/1984 | Japan | 425/28 D |
| 124836 | 7/1984 | Japan | 425/28 D |

Primary Examiner—Jay H. Woo
Assistant Examiner—James C. Housel
Attorney, Agent, or Firm—Sughrue, Mion, Zinn, Macpeak and Seas

[57] ABSTRACT

A tire manufacturing mold comprising a profile ring having a contour corresponding to the outer profile of a tire being molded, including at least the tread thereof, and a net ring having a faying surface for making contact with the contour surface and consisting of ribs and/or lugs for forming the grooves of the tire being molded. The net ring is disposed on the contour surface of the profile ring. The profile ring and/or the net ring has gas vent members embedded so as to form gas vent gaps on the periphery thereof; and the gas vent gaps formed on the periphery of the gas vent members being constructed as gas vent passages.

7 Claims, 44 Drawing Figures

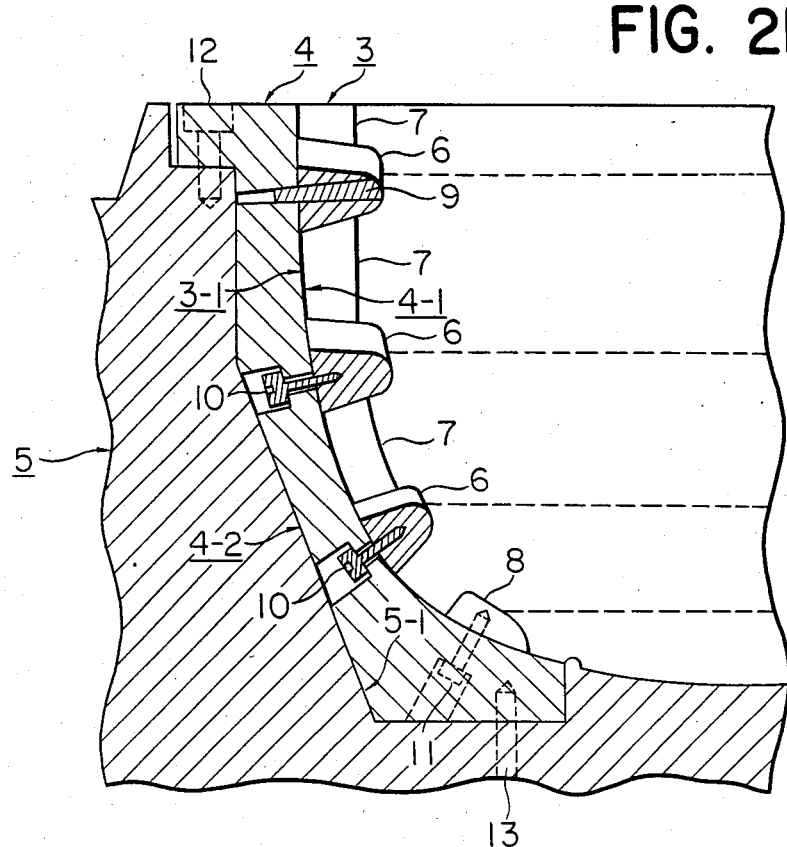
FIG. 2B
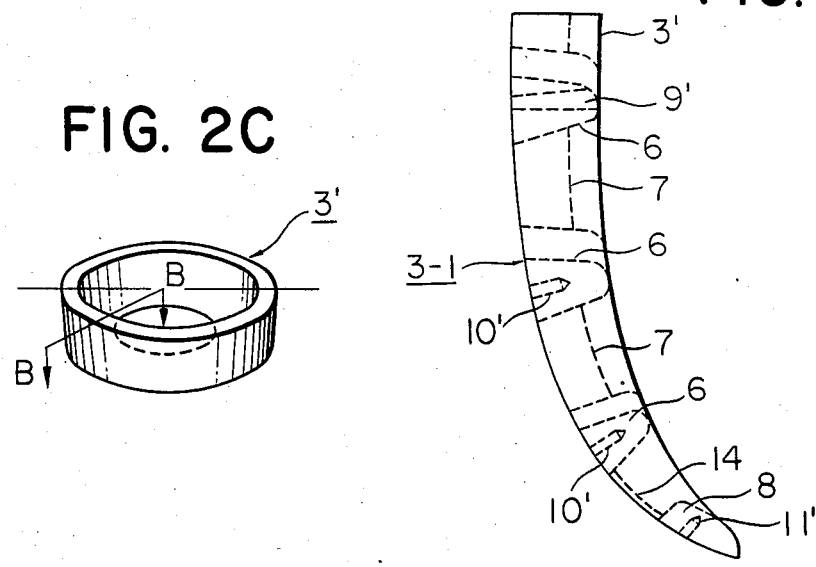
FIG. 2C
FIG. 2D

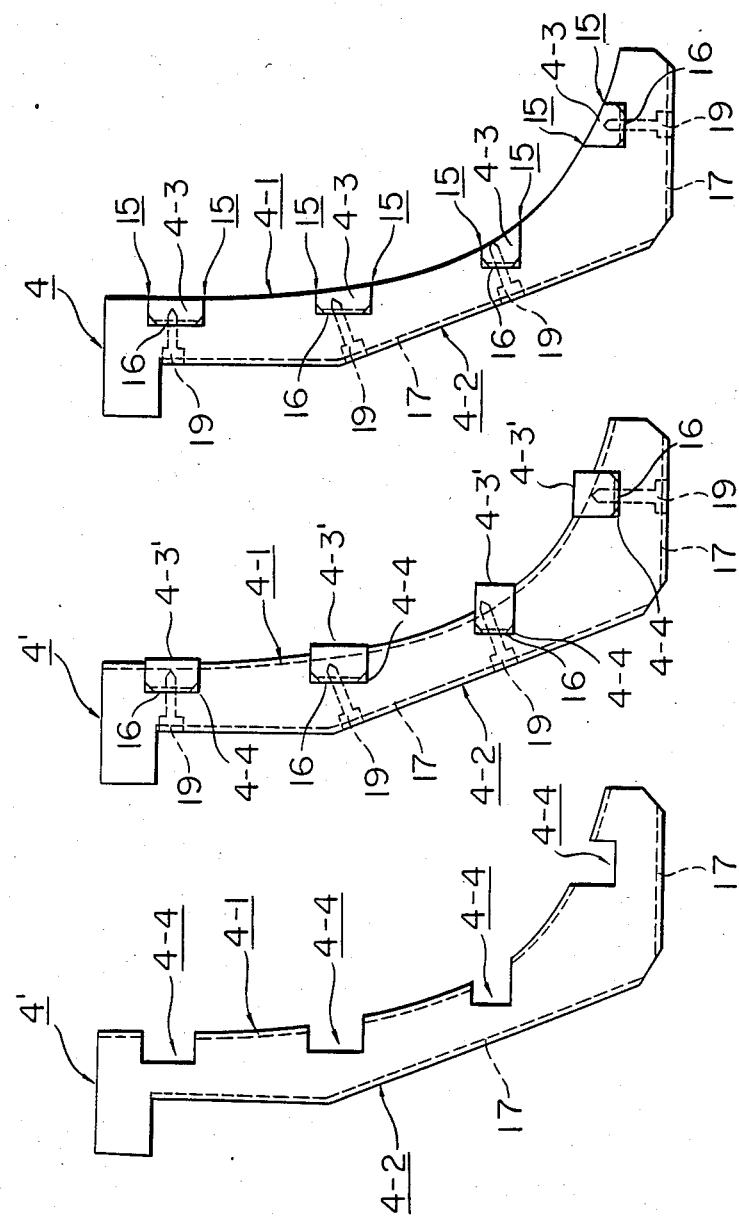

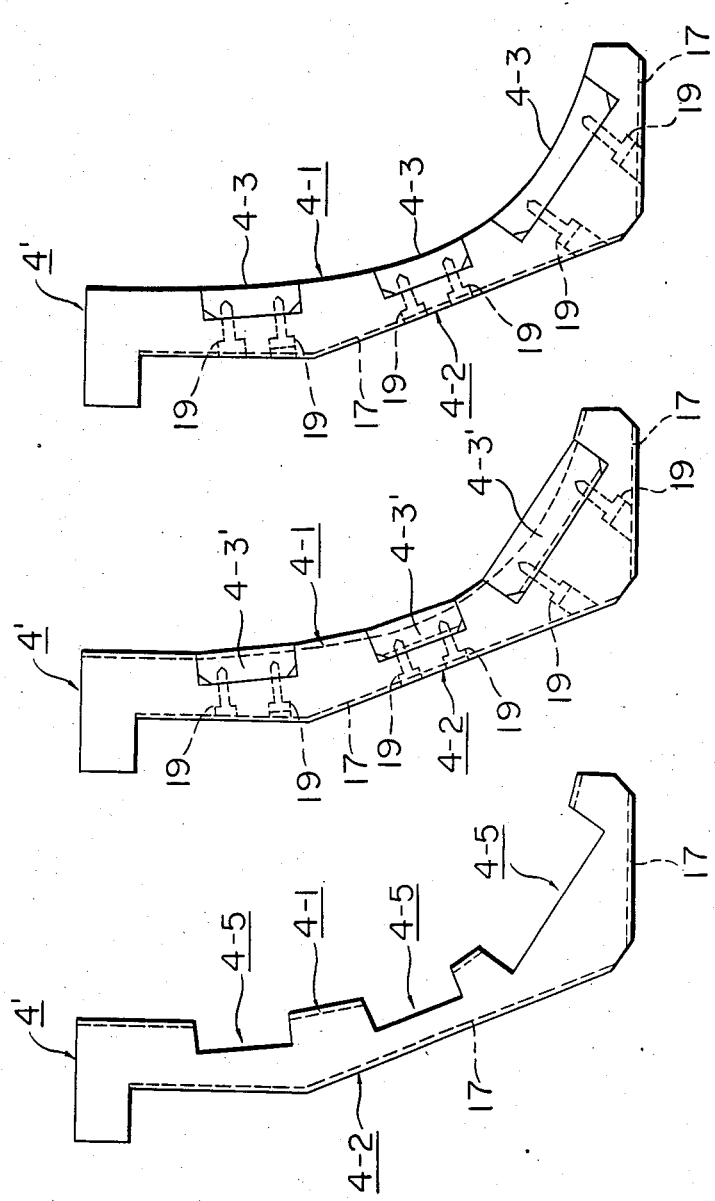

TIRE MANUFACTURING MOLD

BACKGROUND OF THE INVENTION

1. Field of the Invention

This invention relates generally to a tire manufacturing mold and the method of making the same, and more specifically to a tire manufacturing mold comprising a profile ring having an inner circumferential surface corresponding to the outer profile of a tire being molded, including at least the tread thereof, and a net ring having a faying surface for making contact with the inner circumferential surface of the profile ring and consisting of ribs and/or lugs for forming the grooves of the tire being molded; the net ring being disposed on the profile ring; gas vent members being provided on the profile ring and/or the net ring; and venting gaps being formed on the periphery of the gas vent members to form gas vent passages, and the method of making the same.

2. Description of the Prior Art

In general, a tire manufacturing mold has a construction that patterns corresponding the outer profile of a tire being molded, that is as illustrated in FIG. 1, a tread portion 1 corresponding to the tread surface of the tire, and a rib portion 2 corresponding to the grooves on the tire surface, are provided on the inside surface of the mold. It is well known that the pattern formed by the tread portion 1 and the rib portion 2 and dimensional accuracy dictate the sterring, travelling, road-holding and noise suppressing performances of the tire.

Conventional tires have heretofore been manufactured by integrally forming the tread portion 1 and the rib portion 2, or welding the rib portion 2 in advance on the inner circumferential surface constituting the tread portion 1 using various types of precision casting processes, including plaster mold casting, sand casting, ceramic casting, metal mold casting, or engraving, electric discharge machining and other machining processes. With these constructions, the entire mold has to be redesigned and manufactured afresh every time tire design is changed to improve the aforementioned tire performances. In addition, the need for enormous man-hours to change tire design or rearrange tooling entails a substantial increase not only in manufacturing costs but also in manufacturing time.

Furthermore, a tire manufacturing mold has gas vent holes leading to the outside from the mold surface to discharge charge the gas entrapped within the mold during tire molding. During tire molding operations, however, rubber debris often enter the gas vent holes, causing unwanted small projections on the tire surface or the clogging of the gas vent holes. This results in defective tires due to deteriorated gas discharging function or poor tire surface quality.

SUMMARY OF THE INVENTION

It is an object of the present invention to provide a tire manufacturing mold comprising a profile ring having an inner circumferential surface corresponding to the outer profile, including at least the tread surface, of a tire being molded, and a net ring having a faying surface for making contact with the inner circumferential surface and consisting of ribs and/or lugs for forming the grooves of the tire being molded; the net ring being disposed on the profile ring; gas vent members which are embedded flush with the profile ring inner circumferential surface at locations where the gas vent members are covered by the net ring on the profile ring inner circumferential surface, with part thereof being exposed, and are provided; and gas vent gaps are formed as inconspicuously as possible to form gas vent passages on the periphery of the gas vent members so as to make it possible to manufacture a tire manufacturing mold with high precision, low manufacturing costs and reduced manufacturing time, and to prevent the formation of unwanted small projections on the tire surface and the clogging of the gas vent passages, and the method of making the same.

It is another object of the present invention to provide a tire manufacturing mold wherein the gas vent members are formed in a block shape and detachably embedded on the inner circumferential surface of the profile ring so as to enable the gas vent members to be detached individually and to facilitate the removal of foreign matter from the gas vent passages formed on the periphery of the gas vent members, and the method of making the same.

It is another object of the present invention to provide a tire manufacturing mold wherein, in embedding the gas vent members on the inner circumferential surface of the profile ring, each of the gas vent members is supported by a shape memory alloy member one end of which is connected a fixed point; the shape memory alloy member being adapted to support the gas vent member, at a tire molding temperature, at a location where the tip surface of the gas vent member is flush with the inner circumferential surface of the profile ring, and at a non-molding temperature, at a location where the tip surface of the gas vent member protrudes or retracts from the inner circumferential surface of the profile ring so as to make it possible to automatically remove the clogging of the gas vent passages formed on the periphery of the gas vent members.

It is a further object of the present invention to provide a tire manufacturing mold wherein the net ring is formed by joining plate-shape gas vent members having faying surfaces for making contact with the inner circumferential surface of the profile ring to form gas vent gaps having a cross-venting function on the joined portions, and the method of making the same.

It is still a further object of the present invention to provide the manufacturing method of a tire manufacturing mold wherein cross-venting holes are formed by embedding gas vent members at a predetermined depth from the faying surface of the net ring.

It is still a further object of the present invention to provide a tire manufacturing mold having such a construction that the net ring and/or the gas vent members are fastened to the inner circumferential surface from the opposite surface of the profile ring inner circumferential surface by bolts and other fastening means, and the fastening means is used for gas venting.

BRIEF DESCRIPTION OF THE DRAWINGS

FIG. 3 (A) being a developed plan view of the mold surface, FIG. 3 (B) being a crosssectional view taken along the line A—A of FIG. 3

Figure 1:
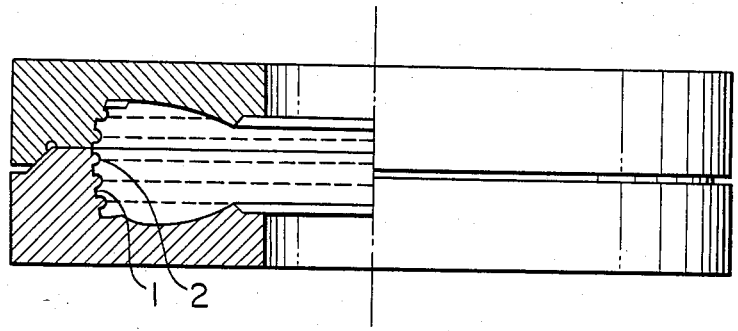
FIG. 1 is a diagram of assistance in explaining a general example of a tire manufacturing mold.
Figure 2A:
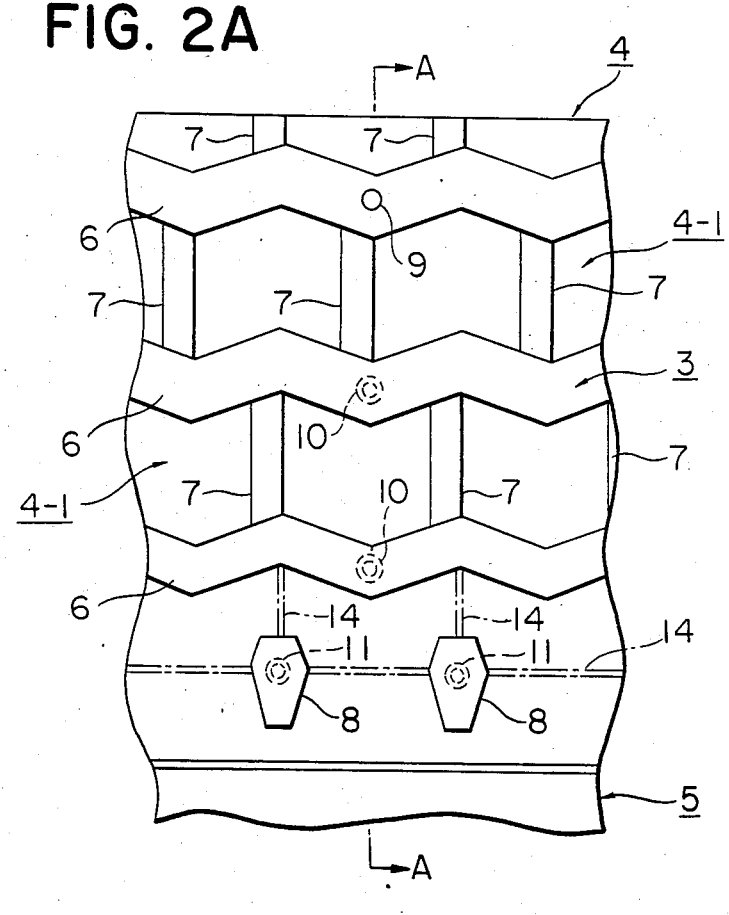
FIGS. 2 (A) through (G) are diagrams of assistance in explaining the basic construction of the tire manufacturing mold of the present invention.
Figure 2E:
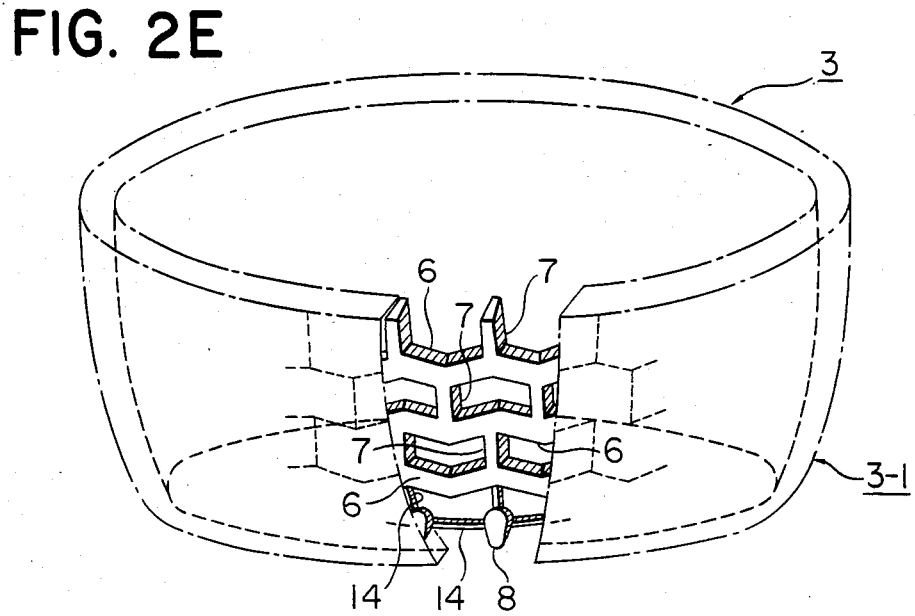
Figure 2G:
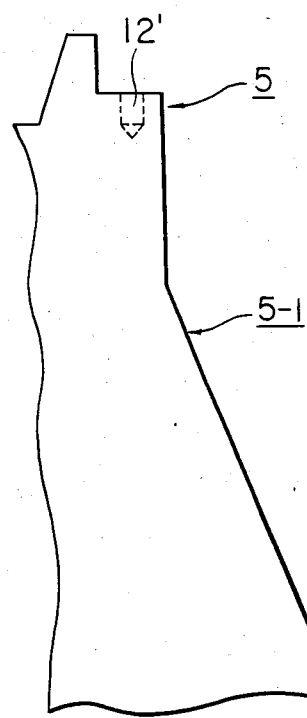
Figure 2F:
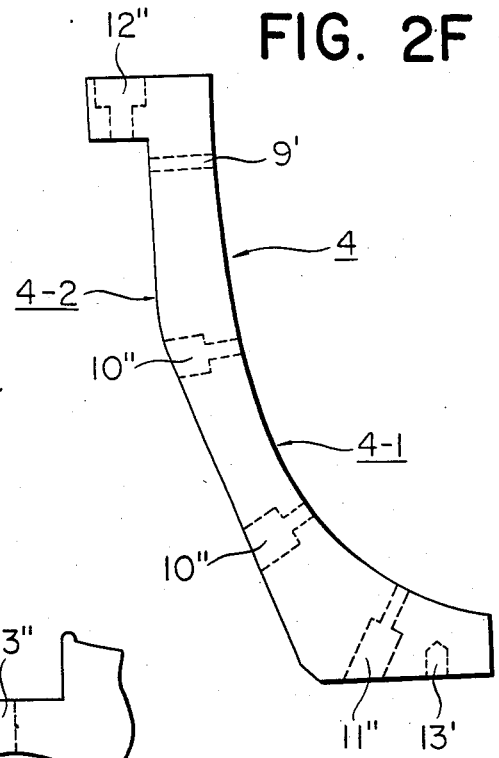
Figure 3A:
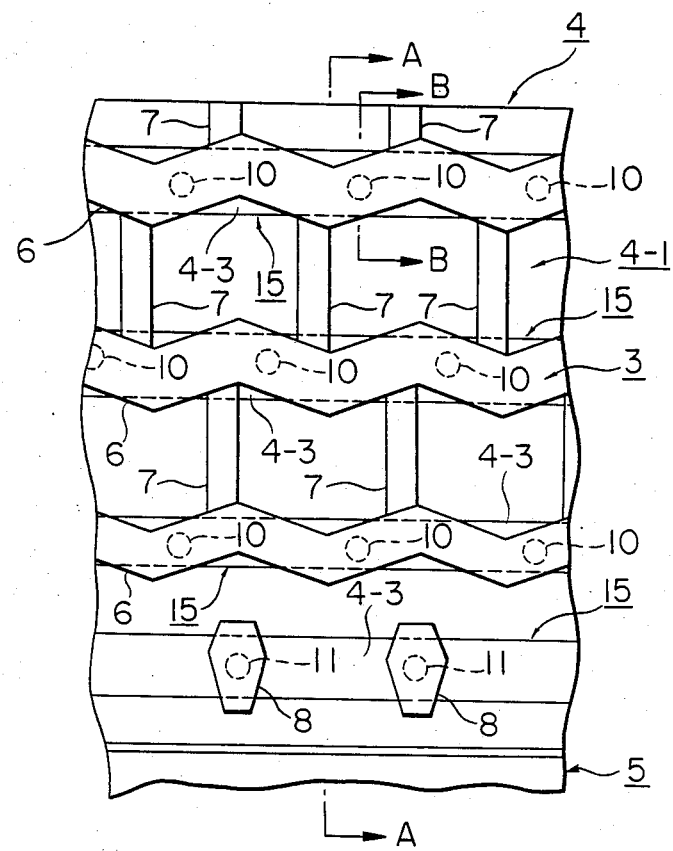
FIG. 3 illustrates a tire manufacturing mold embodying the present invention.
Figure 3B:
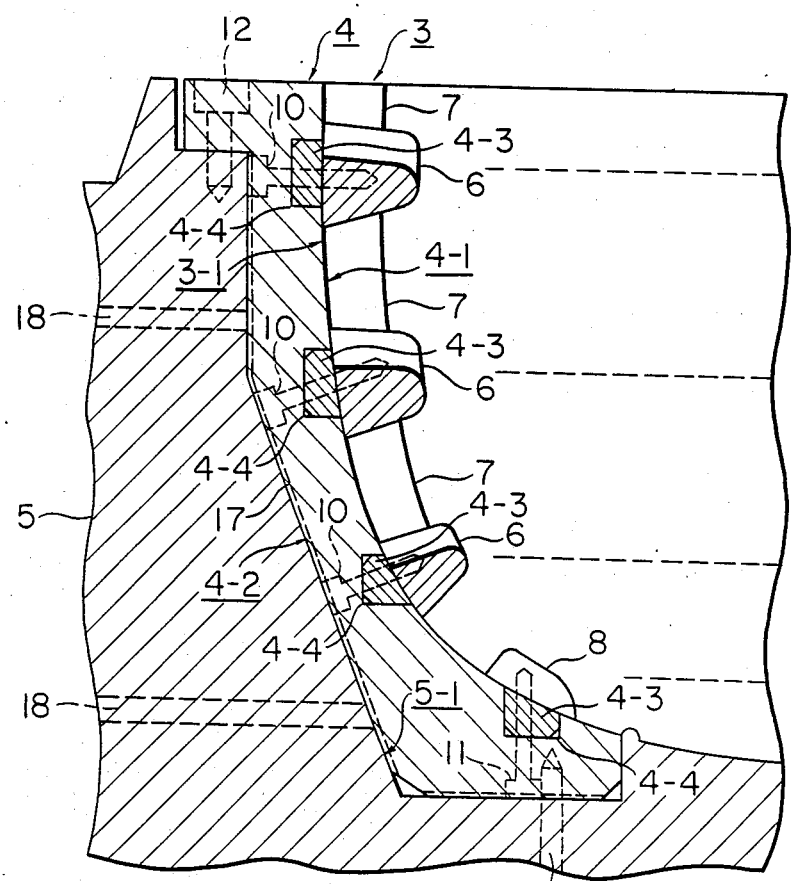
Figure 3C:
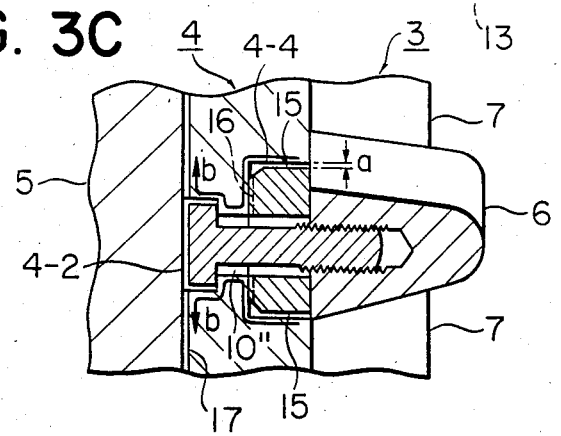

(A), and FIG. 3 (C) being a crosssectional view taken along the line B—B of FIG. 3 (A).

Figure 5A:
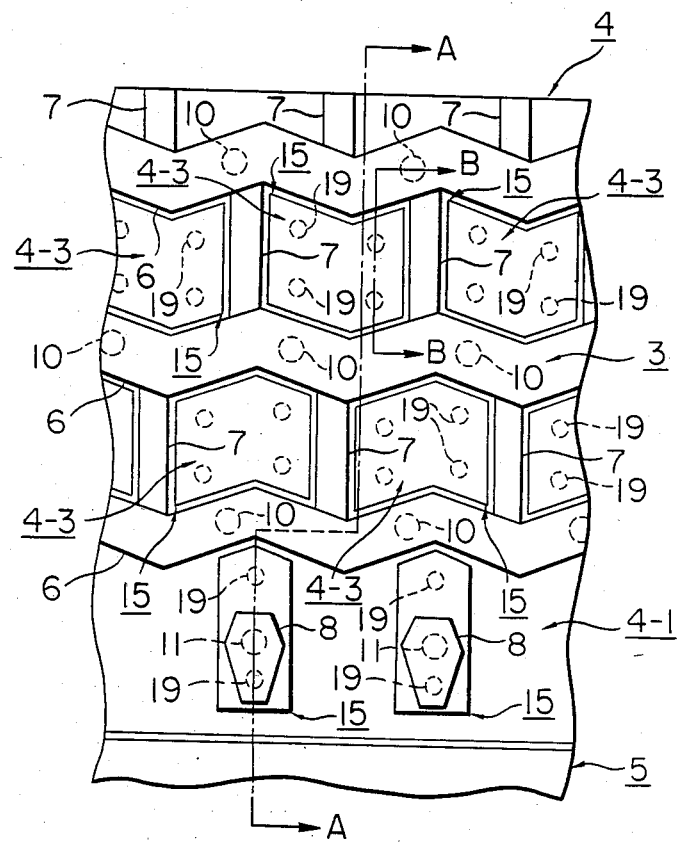
Figure 5B:
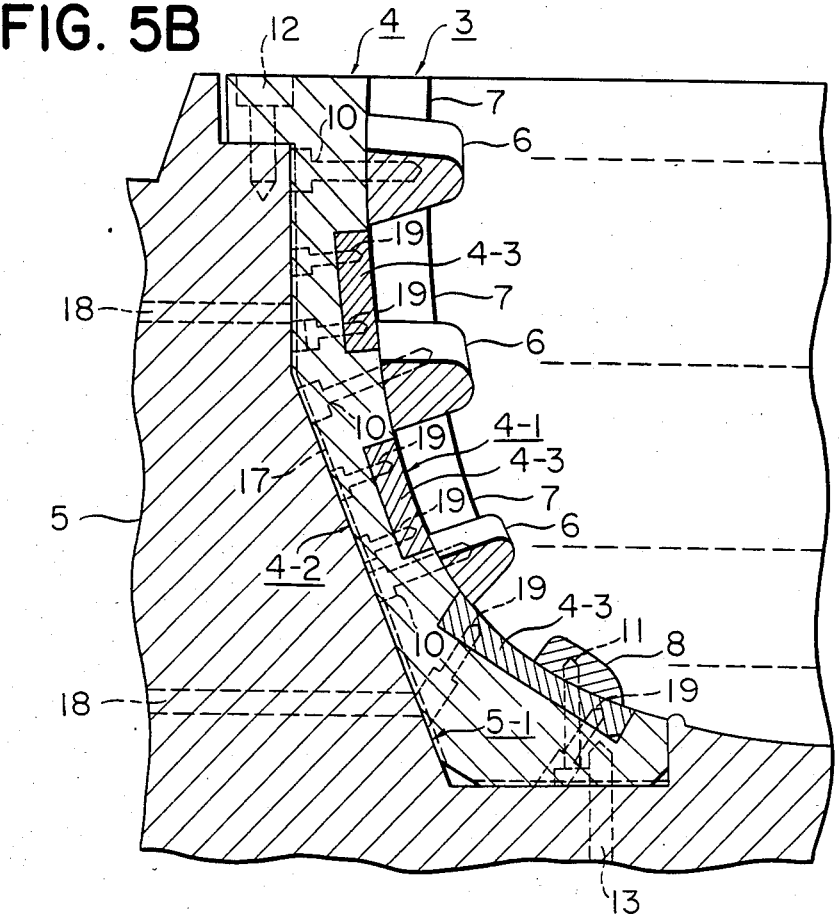
Figure 5C:
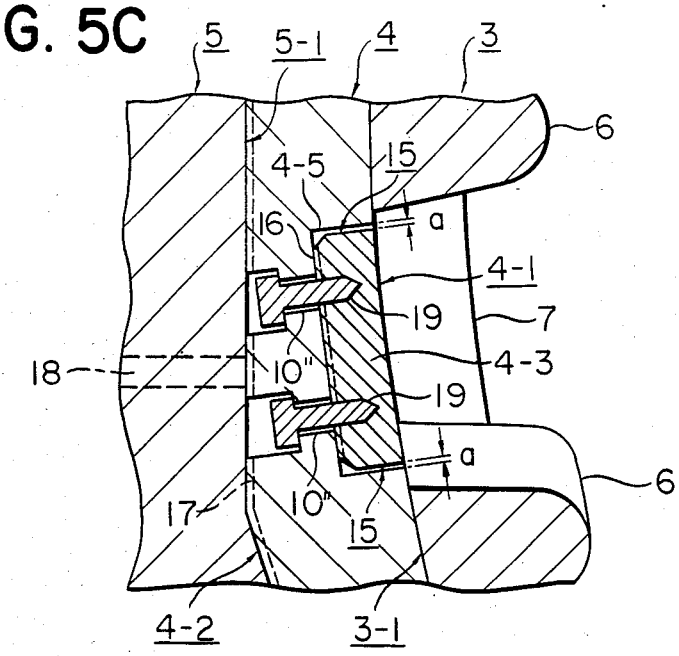

FIGS. 4 (A) through (C) are diagrams of assistance in explaining the profile ring manufacturing process in the embodiment shown in FIG. 3. FIGS. 5 (A) through (C) are diagrams illustrating another embodiment of the tire manufacturing mold of the present invention.

FIGS. 6 (A) through (C) are diagrams of assistance in explaining the profile ring manufacturing process in the embodiment sown in FIG. 5.

Figure 7A:
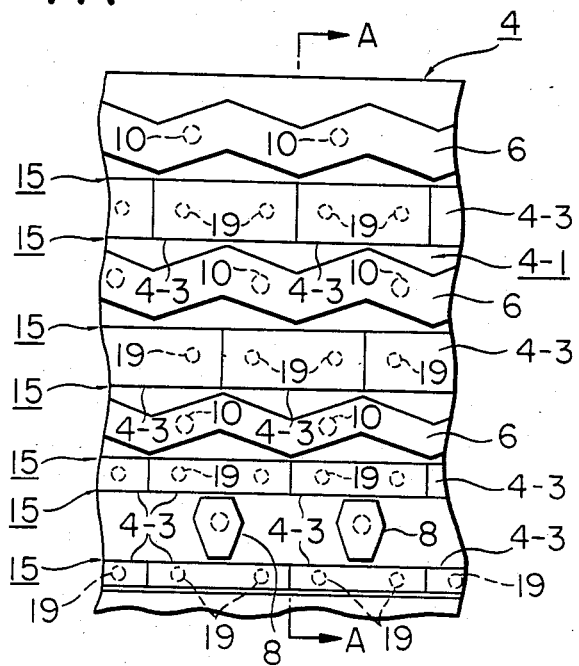
Figure 7B:
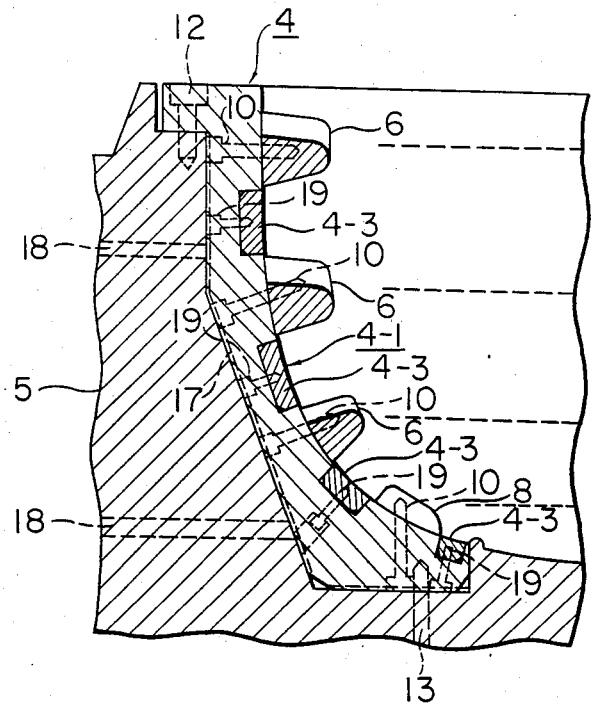

FIG. 7 (A) and (B) are diagrams illustrating still another example of the tire manufacturing mold of the present invention.

Figure 8A:
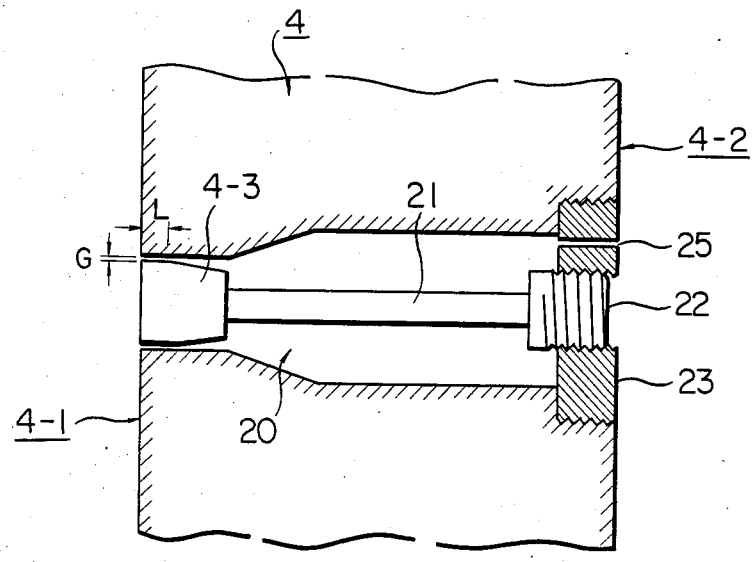
Figure 8B:
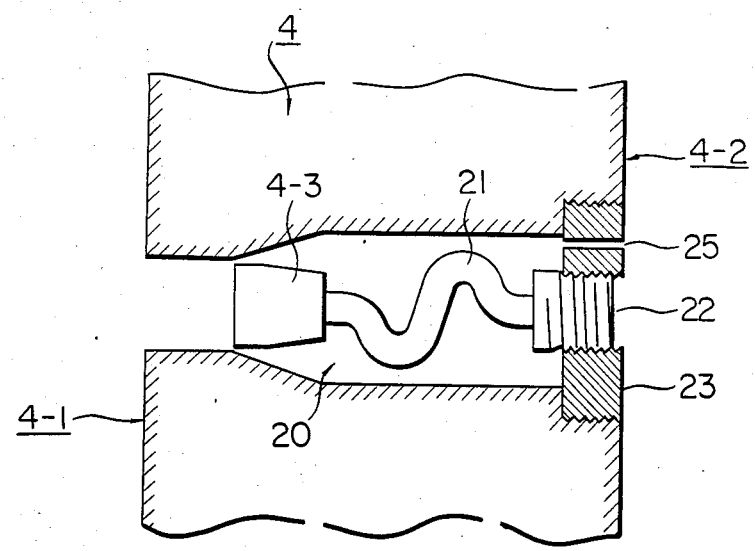

FIGS. 8 (A) and (B), 9 (A) and (B), 10 (A) and (B) and 11 (A) and (B) are diagrams showing the construction of other embodiments of the present invention, respectively.

Figure 12A:
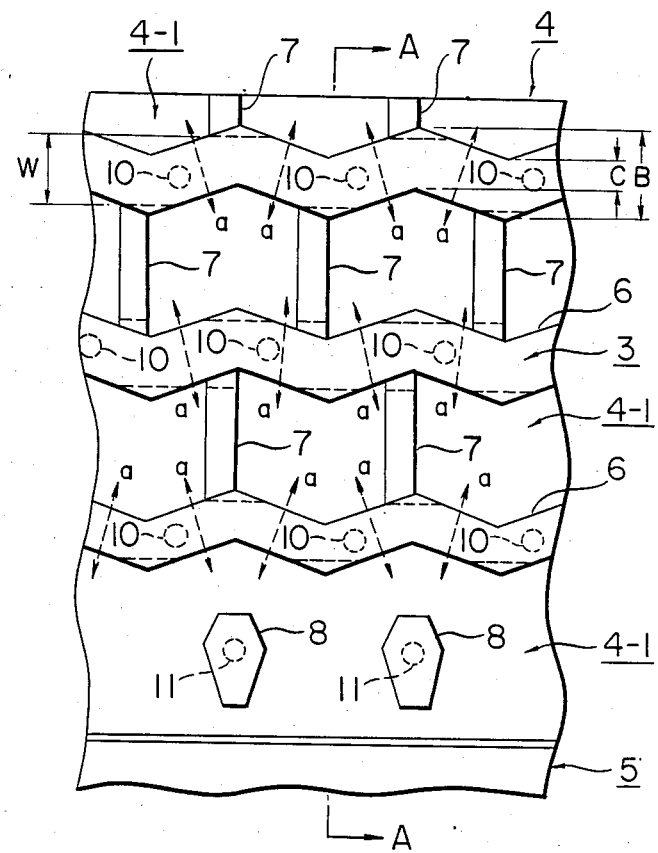
Figure 12B:
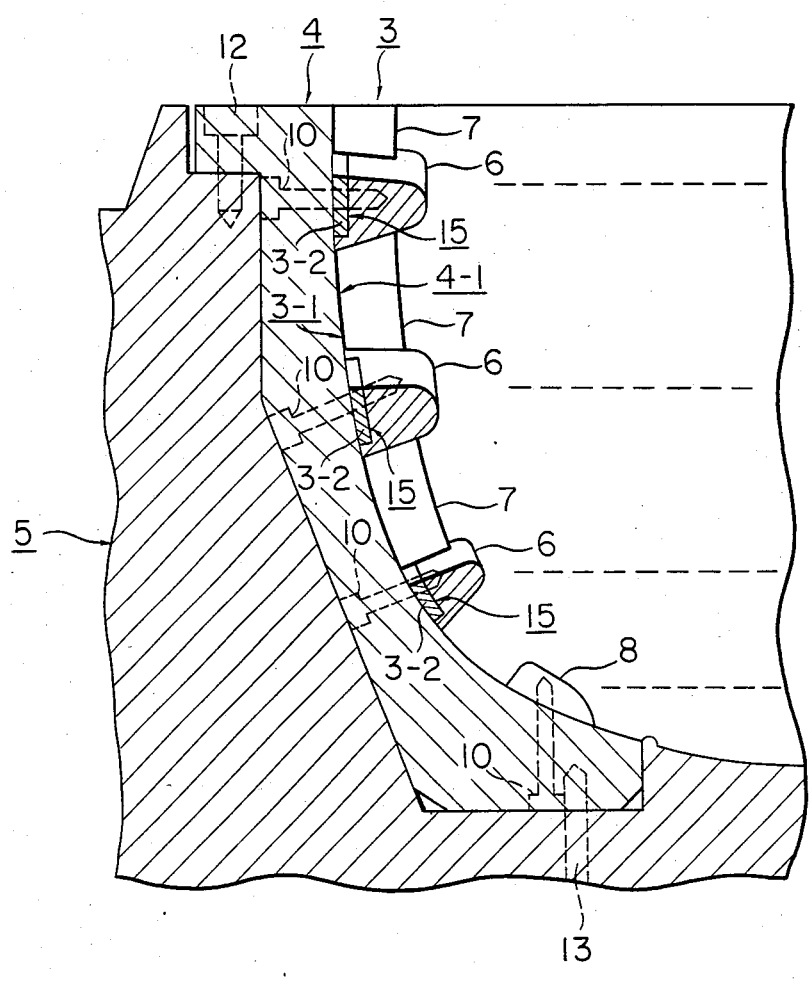
Figure 12C:
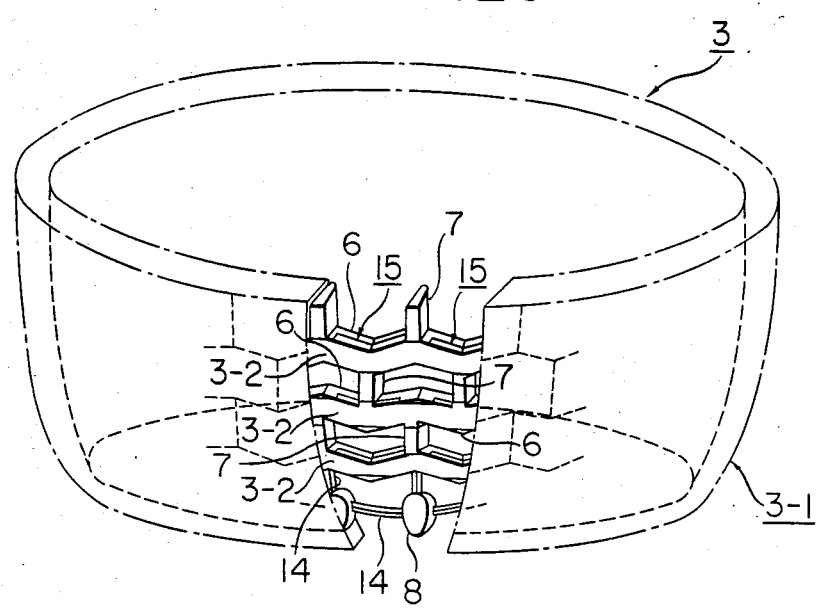

FIGS. 12 (A) through (C) are diagrams of assistance in explaining still a further embodiment of the present invention.

Figure 13A:
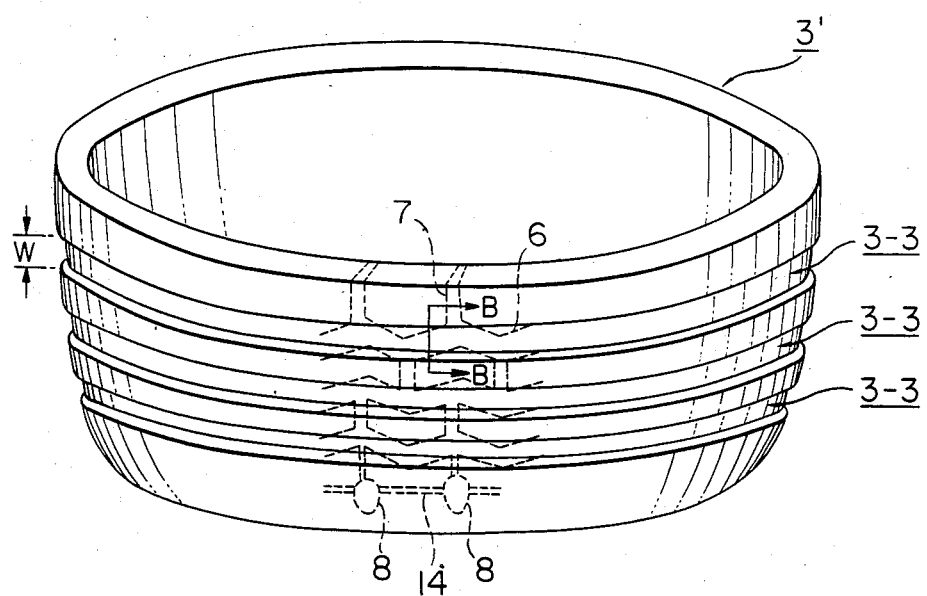
Figure 13B:
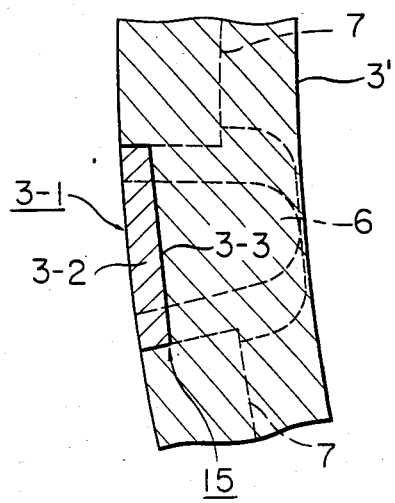
Figure 13C:
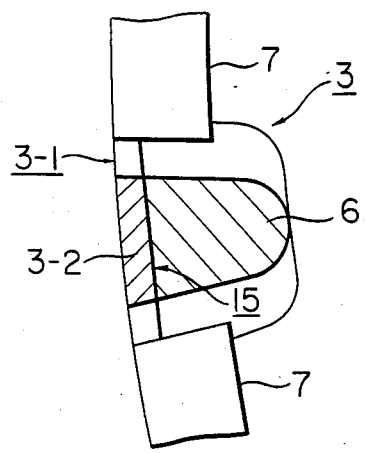

FIGS. 13 (A) through (C) are diagrams illustrating the manufacturing method of the net ring used in the embodiment shown in FIG. 12.

Figure 14:
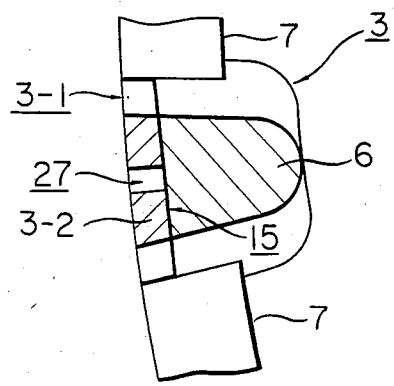
Figure 15:
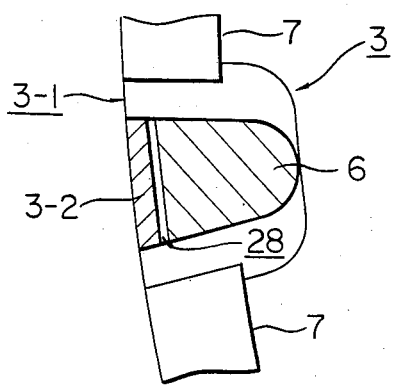
Figure 16:
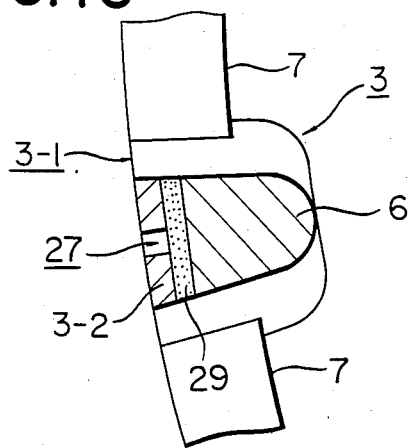

FIGS. 14 through 16 illustrate an embodiment of the manufacturing method of gas vent gaps in the embodiment shown in FIG. 12.

Figure 17:
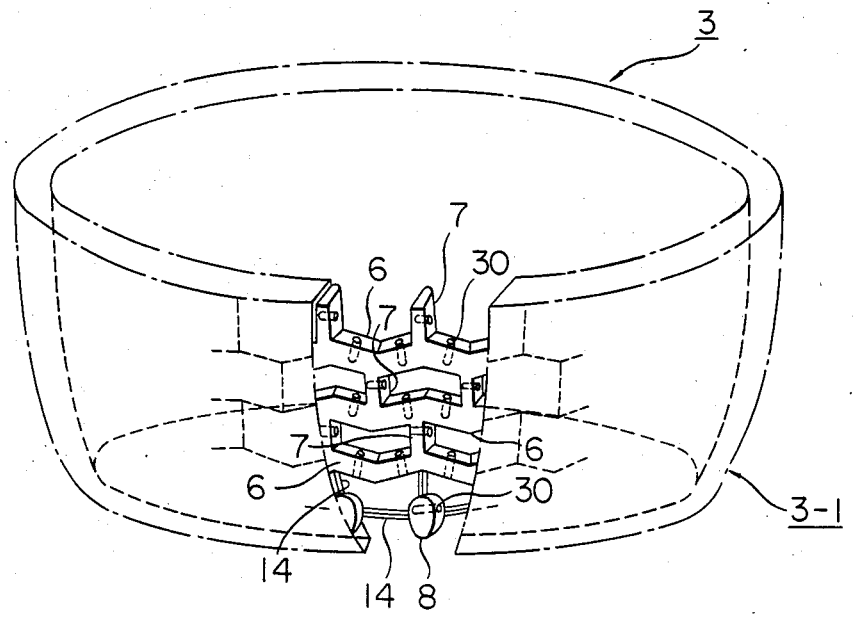

FIG. 17 is a perspective view illustrating another embodiment of the net ring to be manufactured according to the present invention.

Figure 18A:
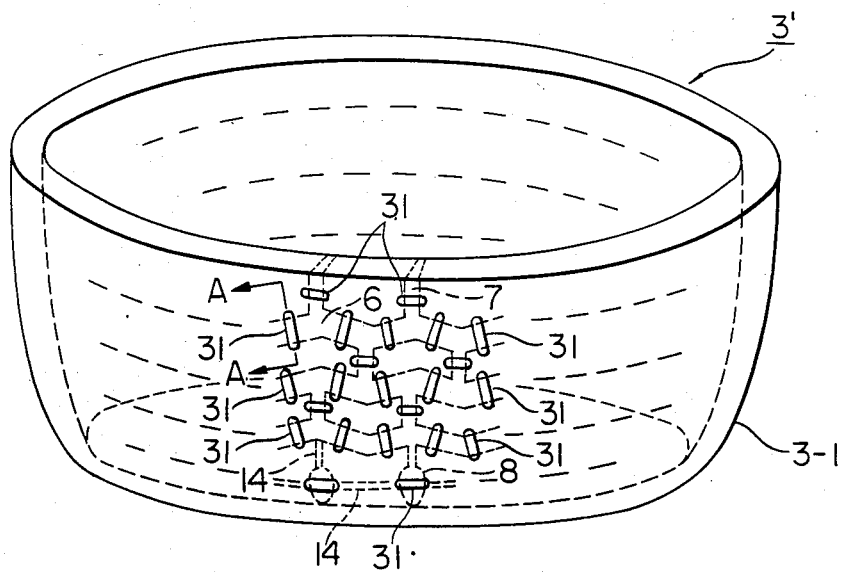
Figure 18B:
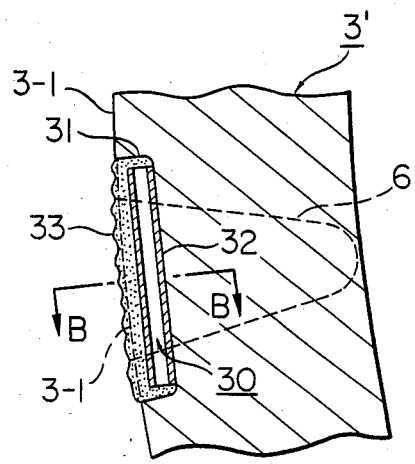
Figure 18C:
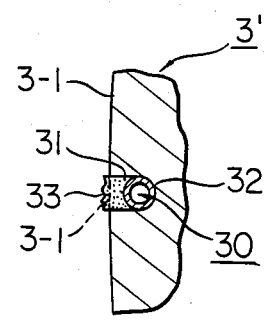

FIGS. 18 (A) through (C) are diagrams illustrating an embodiment of the manufacturing method of the net ring shown in FIG. 17.

Figure 19:
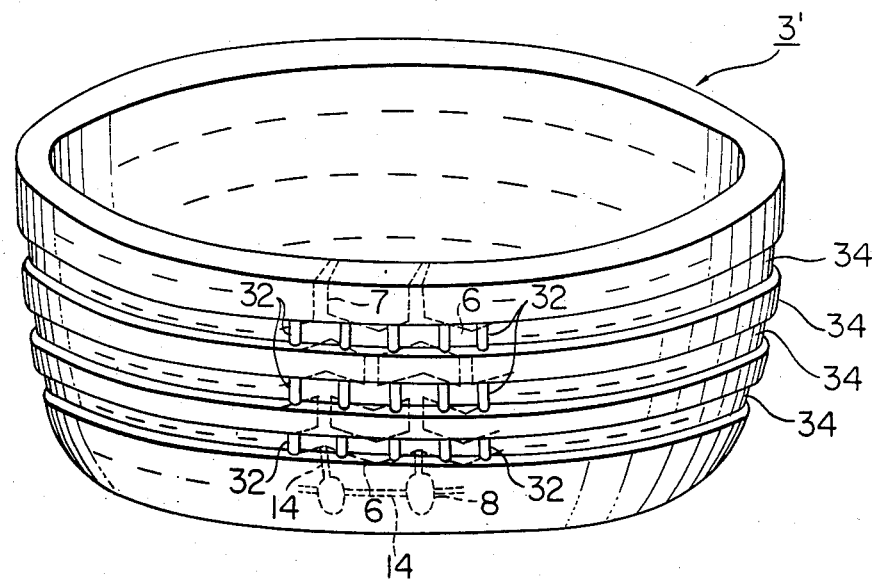

FIG. 19 is a diagram illustrating another embodiment of the net ring manufacturing method according to the present invention.

DETAILED DESCRIPTION OF THE INVENTION

Prior to a specific description of each embodiment of the present invention, the basic construction of the tire manufacturing mold of the present invention will be described, referring to FIGS. 2 (A) through (G).

In the figures, reference numeral 3 refers to a net ring; 3' to a net ring blank; 3-1 to a faying surface; 4 to a profile ring; 4-1 to an inner circumferential surface (hereinafter referred to as contour surface) of the profile ring 4; 4-2 to an outer circumferential surface of the profile ring 4; 5 to a holder; 5-1 to an inner circumferential surface of the holder 5; 6 to a rib; 7 to a lug; 8 to a shoulder rib portion (which is equal to what is called a lug in the present invention, but is specifically referred to as shoulder rib portion to distinguish from the lug 7); 9 to a tapered pin; 9' to a tapered pin hole; 10 through 13 to bolts; 10' through 13' to threaded holes; 10" through 13" to bolt insertion holes; and 14 to a connecting member, respectively. FIG. 2 (A) is a developed plan view of the mold surface, FIG. 2 (B) is a crosssectional view taken along the line A—A of FIG. 2 (A), FIGS. 2 (C) through (E) are diagrams of assistance in explaining the manufacturing process of a net ring, FIG. 2 (F) is a diagram illustrating a profile ring, and FIG. 2 (G) is a diagram illustrating a holder.

As shown in FIGS. 2 (A) and (B), the tire manufacturing mold of the present invention basically consists of a profile ring 4 having a contour surface 4-1 corresponding to the outer profile, including the tread surface, of a tire being molded, a net ring having a faying surface 3-1 for making contact with the contour surface 4-1 and consisting of ribs 6, lugs 7 and shoulder rib portions 8 for forming the grooves of the tire being molded. That is, the net ring 3 is placed on the contour surface 4-1 of the profile ring 4, and fixedly fitted to the profile ring 4 with the tapered pins 9 (straight pins may be used in place of the tapered pins 9) and the bolts 10 and 11, and then the profile ring 4 is fixedly fitted to the holder 5 with the bolts 12 and 13, as shown in FIG. 2 (B). Now, the manufacturing method of the net ring 3, the profile ring 4 and the holder 5 will be described.

In manufacturing the net ring 3, a net ring blank 3' as shown in FIG. 2 (C) is manufactured by machining, for example. In manufacturing the net ring blank 3', at least the faying surface 3-1 is finished with high precision using an NC lathe, for example. The net ring 3 as shown in FIG. 2 (E) is manufactured by machining the ribs 6, the lugs 7, the shoulder rib portions 8, and the connecting members 14 by electric discharge machining, for example, as shown in FIG. 2 (D) which is a crosssectional view taken along the line B—B of FIG. 2 (C). On the net ring 3 provided are the tapered pins 9', the threaded holes 10' and 11', etc. for fixedly fitting the net ring 3 to the profile ring 4, as shown in FIG. 2 (D). Although the net ring 3 may be manufactured by electric discharge machining, as described above, precision casting may be used to manufacture the net ring 3.

As shown in FIG. 2 (F), the profile ring 4 is manufactured to have the contour surface 4-1 corresponding to the tread surface of the tire being molded, the tapered pin holes 9', bolt insertion holes 10" and 11" for fixedly fitting the net ring 3, and the bolt insertion holes 12", the threaded holes 13', etc. for fixedly fitting the the profile ring 4 to the holder 5, which will be described later.

Furthermore, the holder 5 to which the profile ring 4 is fixedly fitted is shown in FIG. 2 (G). That is, the holder 5 has the holder inner circumferential surface 5-1 formed correspondingly to the outer circumferential surface 4-2 of the profile ring 4, and the threaded holes 12' and the bolt insertion holes 13" for fixedly fitting the profile ring 4.

The net ring 3, the profile ring 4 and the holder 5 are separately manufactured and joined together, as shown in FIGS. 2 (A) and (B) to form the basic construction of the tire manufacturing mold of the present invention (the connecting members 14 are removed after the net ring 3 and the profile ring 4 have been joined together.) With this construction, a change in tire design, for example, can be easily accomplished merely by replacing the net ring 3 and the profile ring 4, with the holder 5 left unchanged. This results in a substantial reduction in manufacturing costs and time.

In the foregoing, the basic construction of the tire manufacturing mold of this invention and the benefits thereof have been described. As noted above, the tire manufacturing mold involves a problem of discharging the gas generated during tire molding. That is, the tire manufacturing mold must have gas vent holes to effectively discharge the gas evolving during tire molding, and at the same time, prevent the clogging of the gas vent holes with tire material or the formation of unwanted flashes on the tire. Each embodiment of the present invention proposed to solve these problems will be now described in detail. It should be noted, however, that the present invention has the basic construction described with reference to FIGS. 2 (A) through (G), as noted earlier.

Now, an example of the tire manufacturing mold of the present invention will be described, referring to FIGS. 3 (A) through (C). Like numerals in the figures refer to like parts in FIGS. 2 (A) through (G). Numeral 4' refers to a profile ring blank; 4-3 to a gas vent member; 4-3' to a gas vent member blank; 4-4 to a gas vent member groove; 15 to a gas vent gap; 16 and 17 to gas vent grooves; 18 to a gas vent hole; and 19 to a gas vent member fixing bolt, respectively. FIG. 3 (A) is a developed plan view of the mold surface, FIG. 3 (B) is a crosssectional view taken along the line A—A of FIG. 3 (A), and FIG. 3 (C) is a crosssectional view taken along the line B—B of FIG. 3 (A).

In FIGS. 3 (A) through (C), the contour surface 4-1 is formed after the gas vent member 4-3 is embedded thereon. (The manufacturing method of the profile ring 4 will be described in detail later.) That is, the gas vent member 4-3 is installed in the gas vent member groove 4-4 formed in advance on the contour surface 4-1 so that a gas vent gap 15 of a width a (approximately 0.005 to 0.05 mm), as shown in FIG. 3 (C), is formed between the gas vent member 4-3 and the gas vent member groove 4-4. On the bottom surface of the gas vent member 4-3, a gas vent groove 16 is formed. And, the gas vent gaps 15 and the gas vent grooves 16 form a part of gas vent passages during tire molding. On the outer circumferential surface 4-2 of the profile ring 4 a gas vent groove 17 is formed connecting to the gas vent groove 16 and the gas vent gap 15 via the bolt insertion hole 10', as shown in FIG. 3 (C). Furthermore, the gas vent hole 18 (as shown in FIG. 3 (B)) leading to the gas vent groove 17 is formed on the holder 5. As a result, the gas generated during tire molding flows into the gas vent gap 15 is discharged to the outside via the gas vent groove 16 the bolt insertion hole 10', the gas vent groove 17 and the gas vent hole 18, as shown by an arrow b in FIG. 3 (C). Since the gas vent gap 15 is a fine gap, there is no problem of tire material flowing into the gas vent gap 15 during tire molding. Thus, unwanted small projections, or flashes, can be prevented from being produced on the tire. In this invention, the gas vent gap 15 is provided in close vicinity to the rib 6, the lug 7 and the shoulder rib portion 8. This is to effectively discharge the gas generated during tire molding because the gas tends to be entrapped in the corners of the contour surface 4-1.

Next, the manufacturing method of the tire manufacturing mold shown in FIGS. 3 (A) through (C) will be described.

First, the manufacturing process of the profile ring 4 will be desccribed, referring to FIGS. 4 (A) through (C). FIGS. 4 (A) through (C) are crosssectional views of each of the manufacturing step. In the initial stages of manufacturing, the profile ring 4 may be regarded as a ring shape, as in the case of the aforementioned net ring 3 shown in FIG. 2 (E).

In manufacturing the profile ring 4, a profile ring blank 4' having the gas vent member grooves 4-4 at predetermined locations and a machining allowance for the contour surface 4-1 is first manufactured by lathe turning, for example. On the outer circumferential surface 4-4 of the profile ring blank 4', formed is the gas vent grooves 17 are formed having a shape corresponding to the inner circumferential surface 5-1 (as shown in FIG. 3 (B)) of the aforementioned holder 5 and connecting to the gas vent hole 18 (as shown in FIG. 3 (B)) provided on the holder 5. Next, the gas vent member blank 4-3' is installed in the gas vent member groove 4-4 so that a gap between the gas vent member blank 4-3' and the gas vent member groove 4-4 becomes approximately 0.05 to 0.005 mm, as described, referring to FIG. 3 (C). The gas vent member blank 4-3' has a machining allowance for the contour surface 4-1, and a gas vent groove 16 is formed on the bottom thereof, as in the case of the profile ring blank 4'. The gas vent member blank 4-3' is fixedly fitted to the profile ring blank 4' with a bolt 19. Next, the above mentioned machining allowances provided on the profile ring blank 4' and the gas vent member blank 4-3' are machined, and the contour surface 4-1 is finished.

In the description of the manufacturing process of the profile ring 4, it has been described so that the profile ring blank 4' and the gas vent member blank 4-3' have machining allowances for forming the contour surface 4-1. The contour surface 4-1, however, may be formed in advance on the profile ring blank 4' and the gas vent member blank 4-3'.

The tire manufacturing mold shown in FIGS. 3 (A) and (B) is virtually completed by fixedly fitting the net ring 3, as described, referring to FIGS. 2 (C) through (E), at a predetermined location on the contour surface 4-1 of the profile ring 4, and then fixedly fitting the profile ring 4 on the holder 5 with the bolts 12 and 13. When installing the net ring 3 on the profile ring 4, the bolt 19 for installing the abovementioned gas vent member blank 4-3' may be used in place of the bolt 10. In the tire manufacturing mold shown in FIGS. 3 (A) and (B), the gas vent gap 15 formed between the gas vent member 4-3 and the groove 4-4, the gas vent groove 16, the bolt insertion hole 10'', the gas vent groove 17 and the gas vent hole 18 connected to each other, forming a gas vent passage for discharging the gas generated during tire molding. Since the gas vent gap 15 is a fine gap, there is no fear of tire material flowing into the gas vent gap 15, producing unwanted small projections, or flashes, on the tire surface. It has been described that the gas vent gap 15 is formed by a gap (0.005 to 0.05 mm) between the gas vent member 4-3 and the groove 4-4. The same gas venting effect, however, can be achieved by finishing the outer circumferential surface of the gas vent member 4-3 to a surface roughnesses of approximately 20 to 80 microns and inserting the member 4-3 into the gas vent member groove 4-4.

Although the embodiment of this invention shown in FIG. 3 is constructed of the net ring 3 and the profile ring 4 and the holder 5, this invention is not limited to such a construction, but the profile ring 4 and the holder 5 may be constructed integrally. This holds true with other embodiments of this invention, which will be described later.

Also, in the embodiment shown in FIG. 3, the net ring 3, the profile ring 4 and the holder 5 are integrally formed into a ring shape. This invention, however, may not be limited to such a construction, but the tire manufacturing mold of this invention may be of the so-called split-mold type by radially dividing a stacked assembly of the net ring 3, the profile ring 4 and the holder 5 into a plurality of pieces. Although the terms "net ring" and "profile ring" are used in this invention, the term "ring" of course includes a ring-shaped assembly of individual segments which are machined in advance as such, and a ring-shaped assembly of individual segments which are obtained by dividing what has once been manufactured into a ring shape.

Furthermore, though no mention is made in the description of the manufacturing process of the profile ring 4 with reference to FIGS. 4 (A) through (C), it is desired that, in forming the gas vent member grooves 4-4, 4-4 ---, the grooves 4-4, 4-4 ---, which are formed at locations where the ribs 6 or the lugs 7 are to be provided in the future (for example, the three grooves 4-4, 4-4 --- from the top in the embodiment shown in FIG. 4 (A)), should be machined in the same depth direction, that is, in the direction parallel to each other, as shown in FIG. 4 (A). The reasons for this are as follows. In the tire manufacturing mold of the split-mold type, the net ring 3 can be removed from the profile ring 4. Consequently, if the gas vent member grooves 4-4 are formed in the same depth direction and the gas vent member 4-3 is fitted to the net ring 3, the gas vent member 4-3 can be removed together with the net ring 3. This would be particularly convenient when the gas vent member 4-3 has to be removed for cleaning to ensure the venting performance of the gas vent gap 15. In addition, it is quite easy to machine the gas vent member groove 4-4 in the same direction.

In the embodiment shown in FIG. 3, the gas vent member 4-3 is installed in a ring shape, or in the circumferential direction. This invention, however, may not be limited to such a construction, but the gas vent member 4-3 may be installed in the direction intersecting the circumferential direction, or in the circumferential direction and in the direction intersecting the circumferential direction.

In mounting the gas vent member 4-3 in the gas vent member groove 4-4, the gas vent member 4-3 may be mounted in the gas vent member groove 4-4 as a single piece or as a plurality of divided pieces so as to ensure the intimate contact of the pieces with the groove surface.

As described above, the embodiment shown in FIGS. 3 and 4 makes it possible to produce a tire manufacturing mold with high precision and at reduced manufacturing cost and time, and to prevent the formation of unwanted small projections on the tire surface and the clogging of the gas vent passage with tire material.

Even if small projections are formed on the gas vent gaps, such small projections are formed in the direction virtually normal to the tire tread surface, causing no practical problems.

Next, another embodiment of the present invention will be described, referring to FIGS. 5 (A) through (C). Like numerals in the figures refer to like parts in FIGS. 2 through 4. Numeral 4-5 refers to a recess for accommodating the gas vent member 4-3 (hereinafter referred to as a recess for short). FIG. 5 (A) is a developed plan view of the mold surface. FIG. 5 (B) is a crosssectional view taken along the line A—A of FIG. 5 (A). FIG. 5 (C) is a crosssectional view taken along the line B—B of FIG. 5 (A).

The manufacturing method of the profile ring 4 will be described in detail later. In FIGS. 5 (A) through (C), the contour surface 4-1 is formed with the gas vent member 4-3 embedded thereon. That is, the gas vent member 4-3 is installed in the recess 4-5 which is formed in advance on the contour surface 4-1 so that the gas vent gap 15 of size a (approximately 0.005 to 0.05 mm) shown in FIG. 5 (C) is formed between the gas vent member 4-3 and the recess 4-5. On the gas vent member 4-3 the gas vent groove 16 is provided. Both the gas vent gap 15 and the gas vent groove 16 from part of a gas vent passage during tire molding. As shown in FIG. 5 (C), the gas vent groove 17 connecting to the gas vent groove 16 and the gas vent gap 15 via the bolt transmission hole 10" is formed on the outer circumferential surface 4-2 of the profile ring 4. Furthermore, the gas vent hole 18 (shown in FIG. 5 (B)) connecting the gas vent groove 17 is formed on the holder 5. As a result, the gas generated during tire molding flows into the gas vent gap 15, and is discharged to the outside through the gas vent groove 16, the bolt insertion hole 10", the gas vent groove 17 and the gas vent hole 18. Since the gas vent gap 15 is a fine gap, there is no fear of tire material flowing into the gas vent gap 15, causing unwanted small projections on the tire manufactured. In the present invention, the gas vent gap 15 is provided in close vicinity to the rib 6 or the lug 7, as shown in FIG. 5 (A). This is to facilitate the discharge of gas because the gas generated during tire molding tends to be entrapped in the corners of the contour surface 4-1. The gas vent member 4-3 for forming the gas vent gap 15 can be easily removed individually since the gas vent member 4-3 is installed within the contour surface regions divided by the ribs 6 and the lugs 7. This would be convenient when the gas vent member 4-3 has to be removed for cleaning from time to time.

Next, the manufacturing method of the tire manufacturing mold shown in FIGS. 5 (A) through (C) will be described.

First, the manufacturing process of the profile ring 4 having the gas vent gap 15 will be described, referring to FIG. 6. FIGS. 6 (A) through (C) are crosssectional views showing each stage of the manufacturing process. In the figures, the profile ring 4 may be considered as formed in a ring shape in the early stages of manufacture, as in the case of the abovementioned net ring 3 shown in FIG. 2 (E).

The profile ring blank 4' having a machining allowance for the contour surface 4-1 and having formed thereon the recesses 4-5 at predetermined locations is manufactured by lathe-turning, as shown in FIG. 6 (A). The outer circumferential surface 4-2 of the profile ring blank 4' has a profile corresponding to the inner circumferential surface 5-1 (shown in FIG. 5 (B)) of the holder 5, and has formed thereon the gas vent groove 17 connecting to the gas vent hole 18 (shown in FIG. 5 (B)) provided on the holder 5. As described, referring to FIG. 5 (C), the gas vent member blank 4-3' is installed in the recess 4-5 so that a gap of size 0.005 to 0.05 mm is formed between the gas vent member 4-3 and the recess 4-5. The gas vent member blank 4-3' has a machining allowance for the contour surface 4-1, and has formed on the bottom surface thereon the gas vent groove 16, as in the case of the profile ring blank 4'. The gas vent member blank 4-3' is fixedly fitted to the profile ring blank 4' with the bolts 19. Next, the aforementioned machining allowances provided on the profile ring blank 4' and the gas vent member blank 4-3' are ground or shaped into the contour surface 4-1.

In the description of the manufacturing process of the profile ring 4, it has been mentioned that both the profile ring blank 4' and the gas vent member blank 4-3' have machining allowances for forming the contour surface 4-1. The contour surface 4-1, however, may be formed in advance on the profile ring blank 4' and the gas vent member blank 4-3'.

The tire manufacturing mold shown in FIGS. 5 (A) through (C) is virtually completed by fixedly fitting the net ring 3 described above, referring to FIGS. 2 (C) through (E), to a predetermined position on the contour surface 4-1 on the profile ring 4 with the bolts 10, 10 ---, and then fixedly fitting the profile ring 4 to the holder 5 with the bolts 12 and 13. In the tire manufacturing mold, gas vent passages are formed for discharging the gas evolved during tire molding since the gas vent gap 15 formed between the gas vent member 4-3 and the recess 4-5, the gas vent groove 16, bolt insertion hole 10″, the gas vent groove 17 and the gas vent hole 18 are connected to each other, as described above. Furthermore, since the gas vent gap 15 is a fine gap, there is no fear of tire material flowing into the gas vent gap 15, causing unwanted small projections on the tire manufactured. In the foregoing, it has been described that the gas vent gap 15 of size 0.005 to 0.05 mm is formed between the gas vent member 4-3 and the recess 4-5. The same gas venting effect, however, can be achieved by finishing the outer circumferential surface of the gas vent member 4-3 to a surface roughnesses of 10 to 80 microns and then inserting the member 4-3 into the recess 4-5.

Furthermore, it is desired that the gas vent gap 15 be cleaned by removing the gas vent member 4-3 from time to time to ensure good gas venting condition at all times. In the tire manufacturing mold shown in FIG. 5, only the gas vent member 4-3 can be removed for cleaning the gas vent gap 15 without removing the net ring 3 from the profile ring 4.

Still another embodiment of the present invention is shown in FIG. 7. FIGS. 7 (A) and (B) correspond to FIGS. 5 (A) and (B), that is, FIG. 7 (A) is a developed plan view of the mold surface, FIG. 7 (B) is a crosssectional view taken along the line A—A of FIG. 7 (A).

The tire manufacturing mold shown in FIG. 7 may be considered the same as the embodiment shown in FIG. 5 with the exception that the lugs 7, 7 --- are not provided. Without the lugs 7, 7 ---, the gas vent members 4-3 of a small block form are connected into a ring shape and installed on the profile ring 4. The manufacturing method of the embodiment shown in FIG. 7, which is similar to the manufacturing method of the embodiment shown in FIG. 5, is not described here. The effects of this embodiment is similar to the embodiment shown in FIG. 5.

The recess 4-5 should preferably be machined, with milling or turning, for example, so that the bottom surface of the recess 4-5 becomes a planer or annular surface. With this construction, the machining of the recess 4-5 and the gas vent member blank 4-3′ to be installed in the recess 4-5 is made easier.

Still another embodiment of the present invention will be described in the following, referring to FIGS. 8 through 11. In each embodiment shown in FIGS. 8 through 11, the gas vent member 4-3 in the embodiments shown in FIGS. 3, 5 and 7 is supported by a shape memory alloy member so that the clogging of the gas vent gap 15 is prevented because the gas vent member 4-3 is automatically moved based on the temperature difference during the tire molding period and during the period in which tire is not molded. Like numerals in Figs. 8 through 11 refer to like parts in FIGS. 2 through 7. Reference numeral 20 refers to a gas vent member hole; 21 to a shape memory alloy member; 22 to a threaded portion; 23 to a fixing portion; 24 to a coil spring; 25 to an exhaust portion; and 26 to a flange, respectively.

The embodiment shown in FIG. 8 has a construction such that the gas vent member 4-3 fixedly fitted to one end of the shape memory alloy member 21 is installed in the gas vent member hole 20 provided by piercing the profile ring 4. The other end of the shape memory alloy member 21 is fixedly fitted to the threaded portion 22 fixed to the fixing portion 23.

In the embodiment shown in FIG. 8, the shape memory alloy member 21 remembers the shape thereof at the tire molding temperature so that the tip surface of the gas vent member 4-3 is maintained flush with the contour surface 4-1, as shown in FIG. 8 (A). At the non-molding temperature, on the other hand, the shape memory alloy member 21 remembers the shape at that temperature so that the gas vent member 4-3 is retracted from the contour surface 4-1. In the state shown in FIG. 8 (A), or during tire molding, the gas entrapped in between the contour surface 4-1 and tire material is discharged through the fine gap G formed between the inner circumferential surface of the gas vent member hole 20 and the outer circumferential surface of the gas vent member 4-3. Consequently, an exhaust portion 25 is provided on the fixing portion 23 to discharge gas to the outside. The fine gap G of size approximately 0.005 to 0.05 mm, for example, is sufficient to ensure gas venting, and the length (depth) L of the fine gap G in the order of 0.1 to 0.5 mm will suffice for the purpose. Alignment between the contour surface 4-1 and the tip surface of the gas vent member 4-3 can be fine-adjusted by adjusting the engagement between the threaded portion 22 and the fixing portion 23. Even if foreign matter enters into the fine gap G during tire molding, the clogging of the fine gap G can be prevented since the foreign matter is removed as the gas vent member 4-3 is retracted to a position as shown in FIG. 8 (B) after the tire has been molded, and returned to the original position shown in FIG. 8 (A) during tire molding. The gas flowing out of the exhaust portion 25 is discharged to the outside through the gas vent groove 17 formed on the profile ring outer circumferential surface 4-2 (not shown) and the gas vent hole 18 (shown in FIG. 3 (B), for example) formed on the holder 5.

Figure 9A:
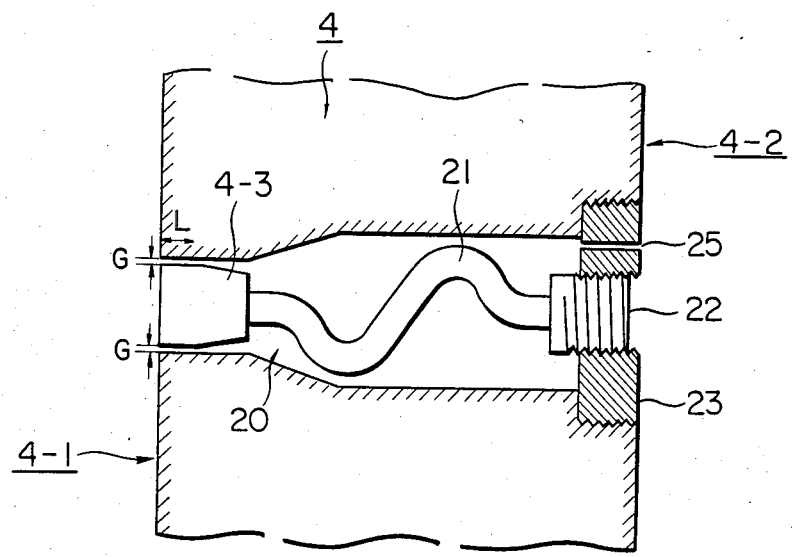
Figure 9B:
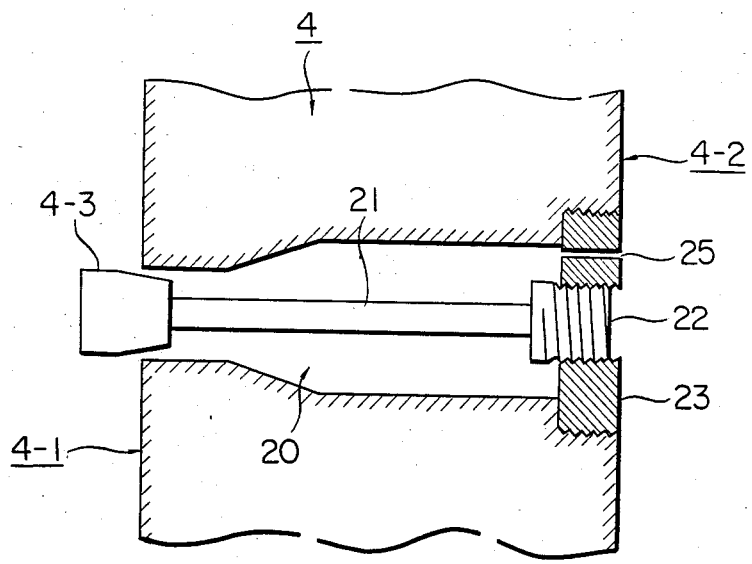

FIG. 9 shows still another embodiment where the shape remembered by the shape memory alloy member 21 is opposite to the embodiment shown in FIG. 8. In the embodiment shown in FIG. 9, the shape memory alloy member 21 remembers the bent shape thereof at the tire molding temperature, and the straight shape thereof at the non-molding temperature. Consequently, the gas vent member 4-3 protrudes from the contour surface 4-1 during the period where tire is not molded, as shown in FIG. 9 (E).

Figure 10A:
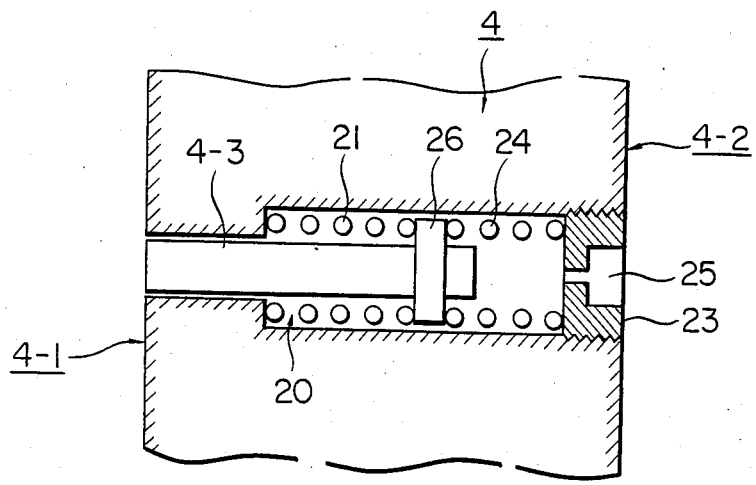
Figure 10B:
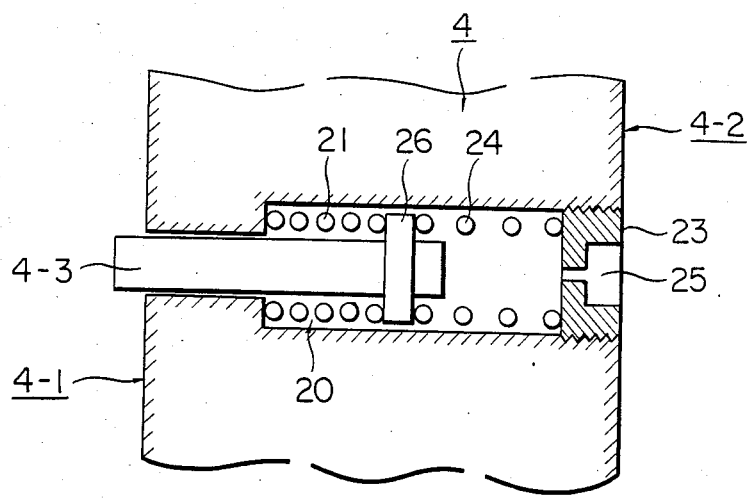

Furthermore, FIG. 10 shows still another embodiment of the present invention where the shape memory alloy member 21 remembers the coiled shape thereof so that the gas vent member 4-3 is held in a state balanced with a coil spring 24. FIG. 10 (A) shows the state of the shape memory alloy member 21 during tire molding, and FIG. 10 (B) the state of the shape memory alloy member 21 during the tire is not molded, respectively. In FIG. 10, the gas vent member 4-3 has a flange 26, and the coil spring 24 is fixedly fitted between one surface of the flange 26 and the fixing portion 23 screwed onto the profile ring outer circumferential surface while the coiled shape memory alloy member 21 is fixedly fitted between the other side of the flange 26 and the contour surface 4-1. The coil spring 24 is used for compressing the shape memory alloy member 21 when the shape memory alloy member 21 is cooled, that is, during non-molding period, as shown in FIG. 10 (B). The strength of the coil spring 24 may be approximately ⅛ to 1/5 as strong as the strength of the alloy. The fixing portion 23, which is screwed onto the gas vent member hole 20, holds one end of the coil spring 24 and has an exhaust portion 25. The exhaust portion 25 is used for discharging the gas flowing through the fine gap between the outer circumferential surface and the inner circumferential surface of the gas vent member hole 20 to the outside, and has a socket-like recess for adjusting the engagement between the fixing portion 23 and the profile ring 4. By adjusting the engagement between the fixing portion 23 and the profile ring 4, the alignment of the contour surface 4-1 and the gas vent member tip surface can be fine-adjusted, as shown in FIG. 10 (A).

Figure 11A:
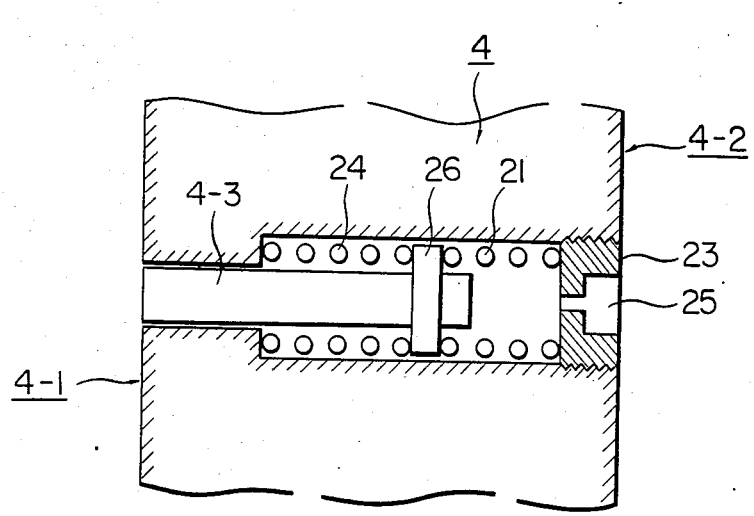
Figure 11B:
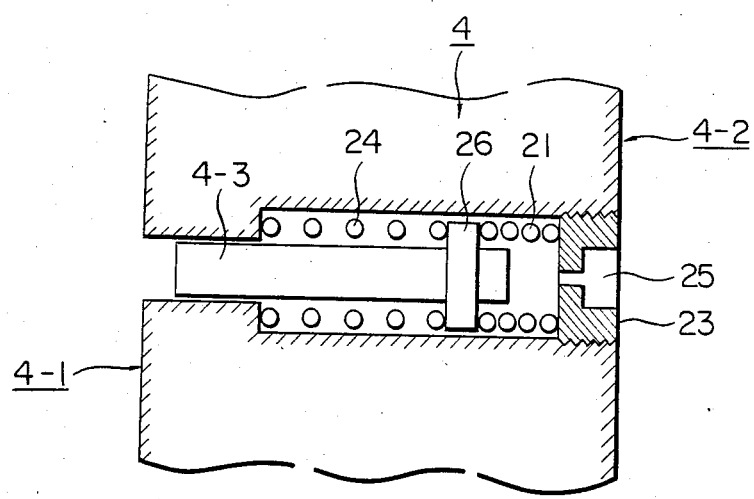

FIG. 11 shows still another embodiment of the present invention where the relative position of the coiled shape memory alloy member 21 and the coil spring 24 is opposite to the embodiment shown in FIG. 10. Since the position of the shape memory alloy member 21 is opposite to the embodiment shown in FIG. 10, the coiled shape memory alloy member 21 is compressed during the non-molding period, causing the gas vent member 4-5 to retract toward the bottom. Thus, the tip of the gas vent member 4-5 is also retracted from the contour surface 4-1, as is apparent by comparing FIG. 10 (B) with FIG. 11 (B). In both the embodiments shown in FIGS. 10 and 11, the coiled shape memory alloy member 21 is compressed by the coil spring 24 during the non-molding period. Needless to say, the shape memory alloy member 21 may be adapted to be compressed by the coil spring 24 during the tire molding period, as is readily conceived. In the embodiments shown in FIGS. 10 and 11, in which the coil spring 24 is used, the coiled shape memory alloy member 21 may not have perfect reversibility in expansion and compression according to the rise and fall of temperature.

In general, the mold temperature rises to as high as 150° C. to 180° C. during tire molding. If the temperature during the non-molding period is set at normal temperatures, a large temperature difference is caused between the tire molding and non-molding periods. To cope with this large temperature difference, cooling air may be forcibly introduced through the exhaust portion 8 to cool the shape memory alloy member 21, though not shown in the FIGS. 8 through 11, allowing a rapid change of state from the tire molding period to the non-molding period. By facilitating the change in this way, the effect of cleaning the fine gap can be improved.

As is apparent from the foregoing description, the clogging of the fine gap can be prevented by discharging gas through the fine gaps and automatically cleaning the fine gap by causing the gas vent member to reciprocate in accordance with the shape remembered by the shape memory alloy member during the tire molding and non-molding periods in the embodiments shown in FIGS. 8 through 11.

Now, still another embodiment of the present invention will be described, referring to FIGS. 12 (A) through (C). The embodiment shown in FIG. 12 is a tire manufacturing mold having gas vent gaps with the so-called cross venting function. FIG. 12 (A) is a developed plan view of the mold surface, FIG. 12 (B) is a crosssectional view taken along the line A—A of FIG. 12 (A), and FIG. 12 (C) is a perspective view of a net ring. Like numerals in the figure refer to like parts in FIGS. 2 through 11. Numeral 3-2 refers to a gas vent member.

In FIGS. 12 (A) through (C) (the manufacturing method of the net ring will be described in detail later.), plate-shaped gas vent members 3-2 are embedded on the faying surface 3-1 of the net ring 3 along the ribs 6, as will be described later, and gas vent gaps 15 are formed on the portions where the net ring 3 is joined with the profile ring 4. Consequently, the tire manufacturing mold shown in FIG. 12 in which the net ring 3 is fixedly fitted to the profile ring 4 with the bolts 10, has the gas vent gaps 15 which serve as the so-called cross vent holes, forming gas vent passages as shown by arrows a, a --- in FIG. 12 (A). That is, the tire manufacturing mold of this invention has a gas venting function of a cross vent type.

Next, the manufacturing method of the tire manufacturing mold shown in FIG. 12 will be described. Since the manufacturing method of the profile ring 4 and the holder 5 has been described earlier, referring to FIGS. 2 (F) and (G), the description thereof is omitted. In the following, an example of the manufacturing processes of the net ring 3 will be described, referring to FIGS. 13 (A) through (C).

(i) In manufacturing the net ring 3, a net ring blank 3' (although FIG. 13 (A) shows the state where grooves 3-3 are formed with the process (ii), which will be described later, the net ring blank 3' may be considered as not having formed the grooves 3-3) is first manufactured. The net ring blank 3' has a curved surface corresponding to the tread surface of a tire being molded, that is, a faying surface 3-1 making contact with a contour surface 4-1 shown in FIG. 12 (B) and machining allowances for forming ribs 6, lugs 7 and shoulder rib portions 8, as shown in FIG. 12 (C). The faying surface 3-1 must be machined with high precision so as to ensure close contact with the contour surface 4-1.

(ii) Next, the grooves 3-3, 3-3 --- are formed in a ring shape along the ribs 6, 6 ---, which are to be frmed later, on the faying surface 3-1, as shown in FIG. 13 (A). The width W of the groove 3-3 may be larger than the minimum width C of the rib 6 at least, and smaller than the maximum width B thereof, as shown in FIG. 12 (A). The inside surface of of the groove 3-3 is machined to surface roughnesses of 5 to 80 so as to form the aforementioned gas vent gap 15 on the joint portion between the gas vent member 3-2 and the groove 3-3 in a state where a gas vent member 3-2, which will be described later, is embedded into the groove 3-3.

(iii) Next, the plate-shaped gas vent member 3-2 is embedded into the groove 3-3, as shown in FIG. 13 (B), which is a crosssectional view taken along the line B—B of FIG. 13 (A). The gas vent member 3-2 shown in FIG. 13 (B), which is formed in advance so as to be in flush with the faying surface 3-1, may have a slightly larger thickness as a machining allowance for machining the faying surface 3-1 after the gas vent member 3-2 has been installed in the groove 3-3. By installing the gas vent member 3-2 in the groove 3-3 in this way, the gas vent gap 15 is formed on the joint portion between the gas vent member 3-2 and the groove 3-3 since the inside surface of the groove is finished to surface roughnesses of approximately 5 to 80 microns, as described above.

(iv) The net ring 3 shown in FIG. 13 (C) can be completed by electric discharge machining the ribs 6, the lugs 7, the shoulder rib portions 8, and the connecting members 14 on the net ring blank 3' after the aforementioned processes (i) through (iii) have been completed. (FIG. 13 (C) is a partially crosssectional view corresponding to FIG. 13 (B)).

The net ring 3 of this invention is manufactured with the processes (i) through (iv) described above. Thus, the tire manufacturing mold with the gas vent gaps 15 having a cross-venting function can be manufactured by fixedly fitting the net ring 3 to the profile ring 4 with the bolts 10 (tapered pins or straight pins may be used in place thereof), and fixedly fitting the profile ring 4 to the holder 5 with the bolts 12 and 13, shown in FIGS. 12 (A) and (B).

In the foregoing, an embodiment of the tire manufacturing mold of the present invention and the method of making the same has been described, referring to FIGS. 12 and 13. This invention, however, is not limited to this embodiment, but may take the forms shown in FIGS. 14 through 16. The embodiment shown in FIG. 14 has a through hole 27, which is formed in advance at an appropriate location near the portion of the gas vent member 3-2, where the rib 6 is to be formed later, in the through-the-thickness direction of the gas vent member 3-2 during the manufacture of the net ring 3. By forming the through hole 27 connecting to the gas vent gap 15, as shown in FIG. 14, and providing a gas vent hole (not shown) connecting to the through hole 27 on the profile ring 4 and the holder 5, a tire manufacturing mold having not only a cross-venting function but also a normal venting function can be manufactured.

The embodiment shown in FIG. 15 is a net ring 3 by which is manufactured by providing a gas vent groove 28 on the surface of the gas vent member 3-2, which makes contact with the bottom surface of the groove 3-3, at a location shown by an arrow a and in the direction shown by the arrow in FIG. 12 (A), for example. By manufacturing the net ring 3 in this way, a tire manufacturing mold having a cross-venting function can be provided, as shown in FIG. 15.

Furthermore, the embodiment shown in FIG. 16 is a net ring 3, which is manufactured by embedding a porous gas vent member 29, as a gas vent gap, on the surface of the gas vent member 3-2, which makes contact with the bottom surface of the groove 3-3, at a location shown by an arrow a in FIG. 12 (A) and in the direction shown by the arrow. A through hole 27 is provided on the gas vent member 3-2. By manufacturing the net ring 3 in this way, a tire manufacturing mold having not only a cross-venting function but also a normal venting function, and involving no unwanted rubber flashes.

Next, another embodiment of the present invention will be described, referring to FIGS. 17 and 18 (A) through (C). FIG. 17 is a perspective view of a net ring in a tire manufacturing mold having cross vent holes. FIGS. 18 (A) through (C) are diagrams in explaining an embodiment of the manufacturing process of the net ring shown in FIG. 17. In the figures, like numerals refer to like parts in FIGS. 2 through 16. Numeral 30 refers to a cross vent hole; 31 to a vent hole groove for accommodating a vent pipe 32; 32 to a vent pipe, made of an electrically conductive material; 33 to a filler metal, which is welded to fill the vent hole groove 31 by means of metal spraying, welding or brazing, respectively.

The manufacturing method of a tire manufacturing mold, which will be described in the following, is that of a tire manufacturing mold comprising a net ring 3 having cross vent holes 30, as shown in FIG. 17, and the profile ring 4 and holder 5 described with reference to the embodiment shown in FIG. 12. Consequently, the manufacturing method of the profile ring 4 and the holder 5 is not described here, and the following description is limited to the manufacturing method of the net ring 3 shown in FIG. 17.

(i) In manufacturing the net ring 3, a net ring blank 3' (shown in FIG. 18 (A)) is first manufactured. The net ring blank 3' shown has a faying surface 3-1 for making contact with the contour surface 4-1 of the profile ring 4 shown in FIG. 2 (B), for example, and machining allowances for forming the ribs 6, lugs 7 and the shoulder rib portions 8 shown in FIG. 17. The faying surface 3-1 must be machined with high precision by means of an NC lathe, for example, so as to ensure close contact with the profile ring contour surface 4-1.

(ii) Next, vent hole grooves 31, 31 --- are provided on the faying surface 3-1, as shown in FIG. 18 (A). As shown in FIG. 18 (A), the vent hole grooves 31, 31 --- are provided so as to connect each region defined by the ribs 6 and the lugs 7, which are to be formed in the final process, as will be described later. Furthermore, the vent hole grooves 31, 31 --- are provided in such a manner that the vent hole groove 31 has a length as long as the width of the rib 6 which is to be formed later, and an appropriate distance (0.5 to 1.0 mm, for example) is kept between the faying surface 3-1 and the inner circumferential surface of a vent pipe 32 to be installed in the vent hole groove 31, as shown in FIG. 18 (B) which is a partially crosssectional view taken along the line A—A of FIG. 18 (A). Though not shown in the figure, the vent hole grooves 31, 31 --- are also formed in a similar manner at locations near the lugs 7, 7 --- and the shoulder rib portions 8, 8 ---. FIG. 18 (C) is a crosssectional view taken along the line B—B of FIG. 18 (B).

(iii) Next, vent pipes 32 are placed in the vent hole grooves 31, 31 ---, as shown in FIG. 18 (B), and then filler metal 33 is deposited by means of metal spraying, welding, brazing or other means to fill each of the vent hole grooves 31, 31 ---. The filler metal 33 is deposited in an amount sufficient to provide an allowance for forming the aforementioned faying surface 3-1 (shown by dotted lines).

(iv) Next, the faying surface 3-1 is formed on the filler metal 33.

(v) The manufacture of the net ring 3 shown in FIG. 17 is completed by forming the ribs 6, the lugs 7 and the shoulder rib portions 8 on the net ring blank 3' by means of electric discharge machining, for example, after the processes (i) through (iv) have been completed.

In the foregoing, description has been made that the faying surface 3-1 is formed on the net ring blank 3' in the process (i). In practice, however, the entire faying surface 3-1 may be machined in the process (iv), not in the process (i).

Now, another example (hereinafter referred to as a second embodiment) of the manufacturing method of the net ring 3 shown in FIGS. 17 will be described, referring to FIG. 19. In the figure, numerals 3', 3-1, 6 through 8, 14, and 32 refer to like parts in FIG. 18, and 34 to a vent hole groove. The second embodiment also involves processes (i') through (v'), similar to the processes (i) through (v) above. That is, the processes (i') through (iv') in the second embodiment correspond to the processes (i) through (v) for the first embodiment.

(i') A net ring blank 3' is manufactured in the same manner as in the process (i) in the first embodiment.

(ii') Ring-shaped vent hole grooves 34, 34 --- are then formed on the faying surface 3-1 of the net ring blank 3', as shown in FIG. 19. The vent hole grooves 34 are formed along the ribs 6, which are to be formed in the subsequent process (v').

(iii') As shown in FIG. 19, vent pipes 32, 32 --- are installed in the vent hole grooves 34, 34 ---, and filler metal is deposited in the vent hole grooves, 34, 34 --- to fill the grooves 34, 34 --- in the same manner as in the process (iii) in the above first embodiment.

The processes (iv') and (v') are exactly the same as the processes (iv) and (v) in the first embodiment.

With the aforementioned processes (i') through (v') for the second embodiment, the net ring 3 (not shown) having the cross vent holes on the ribs 6 thereof can be manufactured.

In the foregoing, description has been made on the first and second embodiments for the manufacture of the net ring of the present invention. The tire manufacturing mold having cross vent holes of the present invention can be manufactured for example by placing the net ring shown in FIG. 17, which has been manufactured with the aforementioned processes, on the contour surface 4-1 of the profile ring 4, in the same manner as in the case of the tire manufacturing mold shown in FIG. 2.

In the above description, the pipes 32 are employed to form cross vent holes 30. In place of the pipes 32, however, a graphite material may be embedded, and a through hole may be machined on the graphite material to form the cross vent hole 30.

In addition, the tire manufacturing mold having not only an exhausting function of the cross-venting type but also an exhaust function of the normal venting type can be manufactured by providing a through hole, as shown by numeral 2 in FIG. 16, on the cross vent hole 30, and providing gas vent holes connecting the through hole on the profile ring 4 and the holder 5.

The aforementioned tire manufacturing mold of the present invention is basically composed of a net ring, a profile ring, and a holder (the profile ring and the holder may be integrally formed). This invention makes it possible to manufacture a tire manufacturing mold having an exhaust function of both the normal venting and cross venting types, which can prevent the formation of unwanted projections on the tire product after molding and the clogging of the gas vent passages, with high precision and at reduced manufacturing cost and time.

What is claimed is:

1. A tire manufacturing mold comprising a profile ring having a contour surface corresponding to the outer profile of a tire being molded, including at least the tread surface thereof, and a net ring having a faying surface for making contact with said profile ring contour surface and consisting of ribs and/or lugs for forming the grooves of said tire being molded, said net ring having an outer surface which include no portion of an inner circumferential surface of said profile ring said, profile ring having gas vent members detachably embedded on said profile ring contour surface at locations relative to said net ring and comprising a part of said profile ring contour surface; gas vent gaps being formed on the periphery of said gas vent members; part of said gas vent members on the periphery thereof being covered by said net ring faying surface; and said gas vent gaps on the periphery of said gas vent members not covered by said net ring faying surface constituting part of gas vent members facing to the back side of said profile ring.

2. A tire manufacturing mold set forth in claim 1 wherein said gas vent members are formed in small blocks and detachably embedded on said profile ring contour surface.

3. A tire manufacturing mold set forth in claim 2 having gas vent holes passing through the inner and outer circumferential surfaces of said profile ring, gas vent members inserted in said gas vent holes and spaced from said gas vent holes by gas vent gaps, and shape memory members provided in said gas vent holes; one end thereof being fixedly fitted to the outer circumferential side of said profile ring and the other end thereof supporting said gas vent members, and characterized in that said shape memory members remember the shape thereof in such a manner that said shape memory members are held, at a tire molding temperature, at a location where the tip surfaces of said gas vent members is flush with said profile ring contour surface, and held, at a non-molding temperature, at a location where said gas vent member tip surfaces protrude or retract from said profile ring contour surface.

4. A tire manufacturing mold comprising; a profile ring having a contour surface corresponding to the outer profile of a tire being molded, including at least the tread surface thereof, and a net ring having a faying surface for making contact with said profile ring contour surface and having ribs and/or lugs for forming the grooves of said tire; said net ring being placed on said profile ring contour surface; and said net ring being constructed by joining a net ring proper and plate-shaped gas vent members forming said faying surface to form gas vent passages facing a back side of said profile ring and having a cross venting function on said joined portion.

5. A tire manufacturing mold set forth in claim 4 wherein said plate-shaped gas vent members have through holes connecting to gas vent passages provided on said profile ring.

6. A tire manufacturing mold set forth in claim 4 wherein gas vent grooves running through said ribs and or lugs are provided on said joined portion of said net ring proper and said plate-shaped gas vent members.

7. A tire manufacturing mold set forth in claim 4 wherein said plate-shaped gas vent members are joined to said net ring proper via porous gas vent members.

* * * * *